US007882498B2

(12) United States Patent
Ottoni et al.

(10) Patent No.: US 7,882,498 B2
(45) Date of Patent: Feb. 1, 2011

(54) METHOD, SYSTEM, AND PROGRAM OF A COMPILER TO PARALLELIZE SOURCE CODE

(75) Inventors: Guilherme D. Ottoni, San Jose, CA (US); Xinmin Tian, Union City, CA (US); Hong Wang, Fremont, CA (US); Richard A. Hankins, San Jose, CA (US); Wei Li, Redwood City, CA (US); John Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1325 days.

(21) Appl. No.: 11/278,329

(22) Filed: Mar. 31, 2006

(65) Prior Publication Data
US 2007/0234276 A1    Oct. 4, 2007

(51) Int. Cl.
G06F 9/45    (2006.01)
(52) U.S. Cl. .................. 717/149; 717/141; 717/150; 717/151; 717/160
(58) Field of Classification Search ......... 717/151–161; 718/100–102, 106
See application file for complete search history.

(56) References Cited

U.S. PATENT DOCUMENTS

| | | | | |
|---|---|---|---|---|
| 5,535,393 A * | 7/1996 | Reeve et al. | ................ | 717/149 |
| 5,768,594 A * | 6/1998 | Blelloch et al. | ............. | 717/149 |
| 5,774,728 A * | 6/1998 | Breslau et al. | .............. | 717/141 |
| 5,781,777 A * | 7/1998 | Sato et al. | .................... | 717/160 |
| 5,812,852 A * | 9/1998 | Poulsen et al. | ............... | 717/149 |
| 6,253,371 B1 * | 6/2001 | Iwasawa et al. | ............. | 717/150 |
| 6,708,331 B1 * | 3/2004 | Schwartz | ...................... | 717/160 |
| 6,993,753 B2 * | 1/2006 | Yamanaka et al. | ........... | 717/140 |
| 7,089,545 B2 * | 8/2006 | Bera | ........................... | 717/160 |
| 7,797,691 B2 * | 9/2010 | Cockx et al. | ................. | 717/155 |
| 2003/0066056 A1 * | 4/2003 | Petersen et al. | ............. | 717/137 |

OTHER PUBLICATIONS

Subhlok et al. (New model for integrated nested task and data parallel programming, Proceedings of the sixth ACM SIGPLAN symposium on Principles and practice of parallel programming, 1997).*

(Continued)

*Primary Examiner*—Lewis A Bullock, Jr.
*Assistant Examiner*—Hang Pan
(74) *Attorney, Agent, or Firm*—Konrad Raynes & Victor LLP; David W. Victor (57) ABSTRACT

Provided are a method, system, and program for parallelizing source code with a compiler. Source code including source code statements is received. The source code statements are processed to determine a dependency of the statements. Multiple groups of statements are determined from the determined dependency of the statements, wherein statements in one group are dependent on one another. At least one directive is inserted in the source code, wherein each directive is associated with one group of statements. Resulting threaded code is generated including the inserted at least one directive. The group of statements to which the directive in the resulting threaded code applies are processed as a separate task. Each group of statements designated by the directive to be processed as a separate task may be processed concurrently with respect to other groups of statements.

24 Claims, 6 Drawing Sheets

OTHER PUBLICATIONS

Benkner et al. (Exploiting Data Locality on Scalable Shared Memory Machines with Data Parallel Programs , Euro-Par 2000 Parallel Processing, 2000).*

Hind, M., "Pointer Analysis: Haven't We Solved This Problem Yet?", *ACM SIGPLAN-SIGSOFT Workshop on Program Analysis for Software Tools and Engineering*, Jun. 2001.

OPENMP Architecture Review Board, "OpenMP C and C++ Application Program Interface", Version 2.0, Mar. 2002.

Cytron, R., J. Ferrante, B. Rosen, M. Wegman, & F.K. Zadeck, "Efficiently Computing Static Assignment Form and the Control Dependence Graph", ACM Trans. On Programming Languages and Systems, Oct. 1991.

Ghiya, R.& L. Hendren, "Is it a Tree, a DAG, or a Cyclic Graph? A Shape Analyis for Heap-Directed Pointers in C. Principles of Programming Languages", 1996.

Girkar, M., & C. Polychronopoulos, "Automatic Extraction of Functional Parallelism from Ordinary Programs", *IEEE Trans on Parallel and Distributed Systems*, vol. 3, No. 2, Mar. 1992.

Girkar, M., & C. Polychronopoulos, "Extracting Task-level Parallelism", *ACM Trans. On Programming Languages and Systems*, vol. 17, No. 4, Jul. 1995.

Lee, W., R. Barua, M. Frank, D. Srikrishna, J. Babb, V. Sarkar, & S. Amarasinghe, "Space-time Scheduling of Instruction-level Parallelism on a Raw Machine", *International Conference on Architectural Support for Programming Languages and Operating Systems*, 1998.

Ottoni, G., R. Rangan, A Stoler, M. Bridges, & D. August, "From Sequential Programs to Concurrent Threads", *IEEE Computer Architecture Letters*, Jun. 2005.

Ottoni, G., R. Rangan, A. Stoler, & D. August, "Automatic Thread Extraction with Decoupled Software Pipelining", *IEEE/ACM International Symposium on Microarchitecture*, Nov. 2005 (to appear).

Rich, K., & M. Farrens, "Code Partitioning in Decoupled Compilers", *European Conference on Parallel Processing*, Sep. 2000.

Shah, S., G. Haah, P. Peterson, & J. Throop, "Flexible Control Structures for Parallelism in Open MP", *First European Workshop on OpenMP*.

Su, E., X. Tian, M. Girkar, G. Haab, S. Shah, & P. Peterson, "Compiler Support of the Workqueuing Execution Model for Intel SMT Architectures", *European Workshop on OpenMP*, 2002.

"Static Single Assignment Form" from Wikipedia, downloaded from http://en.wikipedia.org/wiki/Static_single_ assignment_form on Feb. 22, 2006.

Ferrante, J., K.J. Ottenstein, and J.D. Warren, "The Program Dependence Graph and Its Use in Optimization", ACM Transactions on Programming Languages and Systems, vol. 9, No. 3, Jul. 1987, pp. 319-349.

* cited by examiner

Source Code

FIG. 2B

Control Flow Graph

FIG. 2C

Post Dominator Tree

```
parallel taskq private(ptr3) reduction (+ : tot2)
(1) while ((ptr3 = Phi (ptr1,ptr2)) != NULL) {
(7)   ptr2=ptr3->next;
      task captureprivate(ptr3) {          132
(2)     if (!ptr3->skip)
(3)       if (ptr3->type == X)
(4)         ptr3->val2 = F(ptr3->val2);
(6)     tot2 += ptr3-> val2;
      }                                    134
      task captureprivate(ptr3)
(5)     ptr3->val1 = G(ptr3->val1);
```

Resulting Code

METHOD, SYSTEM, AND PROGRAM OF A COMPILER TO PARALLELIZE SOURCE CODE

BACKGROUND

Microprocessor vendors are offering multi-core microprocessors that allow parallel or concurrent execution of code. Compilers providing parallelization functions transform code written for sequential execution into code capable of being executed in parallel by the different cores of the multi-core microprocessor. Compilers have been developed to parallelize code used for scientific application. However, for non-scientific applications, programmers often rewrite the code and include directives to cause different sections of the code to be executed in parallel.

The process of the programmer modifying the code to include directives and statements for parallel execution is a complex, time consuming, and error prone task. For this reason, language extensions have been developed to assist the programmer in parallelizing code initially written for sequential execution. One technique developed for parallelizing code to account for issues such as loop-carried dependences, irregular memory accesses and arbitrary control flow is the taskqueuing model. According to this model, the programmer inserts task queuing pragmas into the code to cause the code outside the task pragmas to be executed sequentially in one thread. When this thread encounters a task pragma, it enqueues the task into the task queue, including a copy of any captured variables. Other threads operate by dequeuing tasks from the queue and executing the part of the code inside the queued task pragma.

Although the taskqueuing model and programming extensions enable programmers to add parallelism to application source code, identifying opportunities in the code for parallelism and correctly coding the parallel directives (e.g. shared vs. privatized variables) still takes significant programmer time and effort. The complexity is especially a problem for general applications due to their higher complexity, larger code size, and less regular nature.

DETAILED DESCRIPTION

Figure 1:
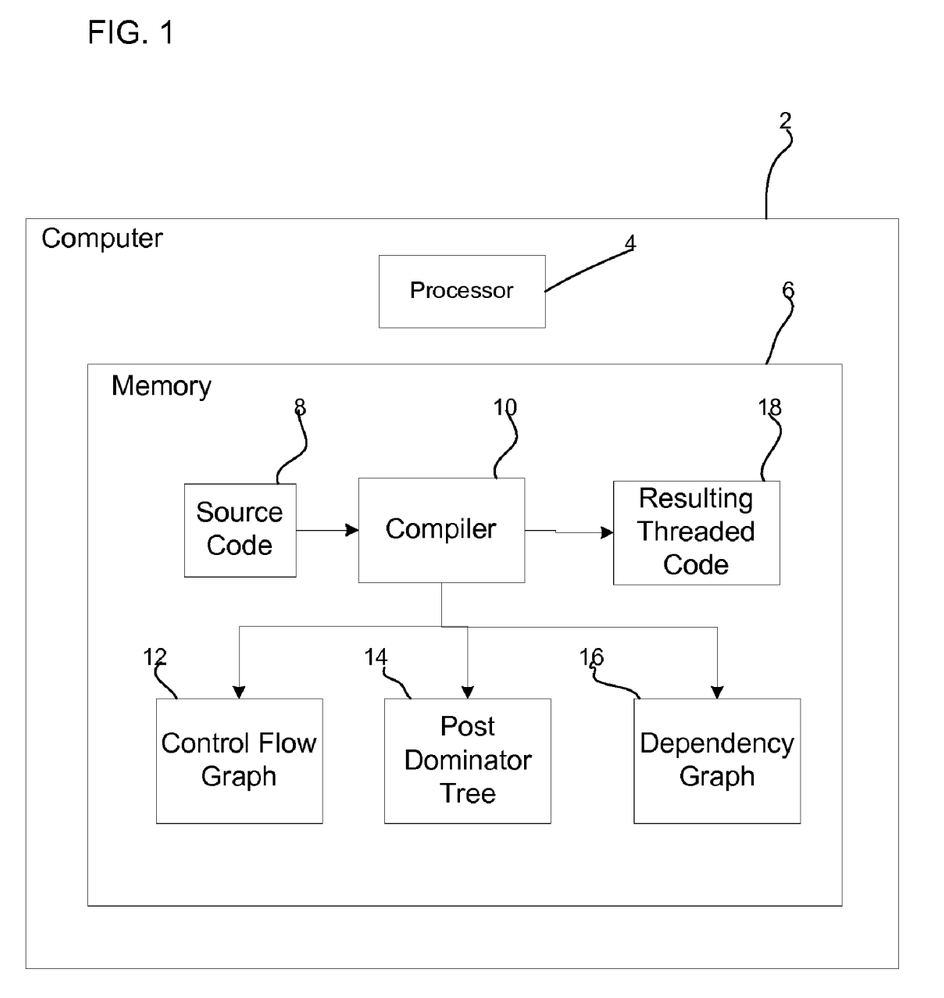
FIG. 1 illustrates an embodiment of a computing environment.

FIG. 1 illustrates a computing environment in which a compiler is implemented. A computer 2 includes a processor 4 (such as one or more central processing units (CPU)), and a memory 6 (comprised of one or more memory or storage devices, where virtual memory may reference data in either a memory device or magnetic disk). The memory 6 includes the following files and programs, source code 8 including program statements in a high level language, such as C++, etc. and a compiler 10. To modify the source code 8 to allow for parallel processing of the source code 8 statements, the compiler 10 may generate a control flow graph 12, a post dominator tree 14, and a dependency graph 16. Based on the generated control and data dependency information 12, 14, and 16, the compiler 10 may rearrange the source code 8 statements and insert directives or pragmas into the source code to generate resulting threaded code 18, 130 in FIG. 2E, also known as resulting auto-task queuing code. The 'taskq' directives instruct the main (or producer) thread to sequentially execute the statements and to enqueue a task whenever a 'task' directive is encountered. The enqueued task consists of the group of statements syntactically inside the 'task' directive. The enqueued tasks can be concurrently executed by multiple consumer threads.

Figure 2A:
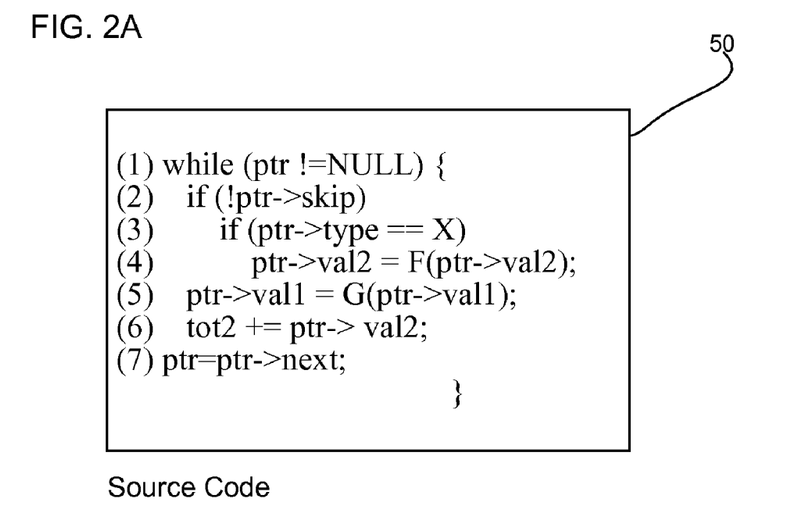
FIG. 2A illustrates an example of source code.

FIG. 2A illustrates an example of source code 50 that may be provided to the compiler 10. The code of FIG. 2A comprises a simple while-loop that traverses a linked list of elements, doing some processing to each element and computing a sum reduction (tot2).

Figure 2B:
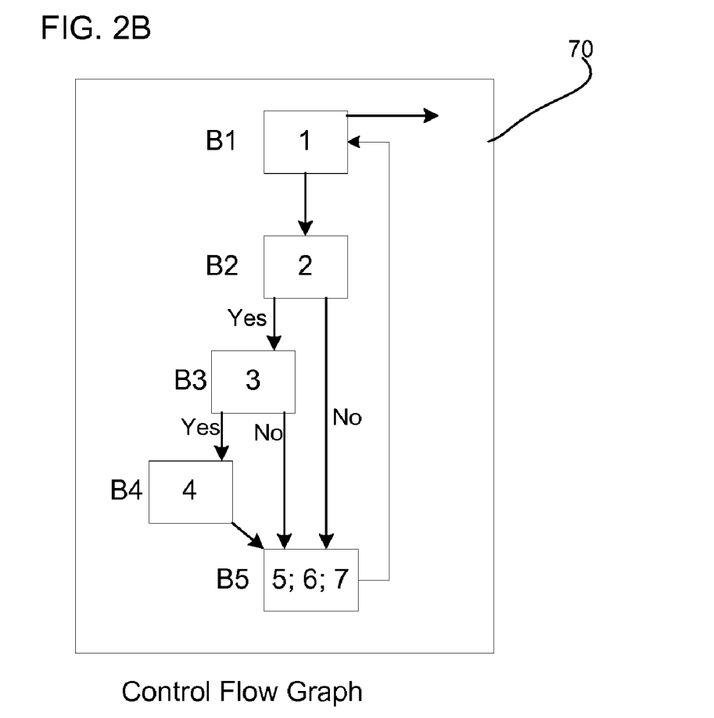
FIG. 2B illustrates an example of a control flow graph based on the source code in FIG. 2A.

FIG. 2B illustrates the control flow graph (CFG) 70 corresponding to the source code 50 in FIG. 2A. The nodes B1 . . . B5 each represent a basic block. For instance, B5 includes source code statements (5), (6), and (7).

Figure 2C:
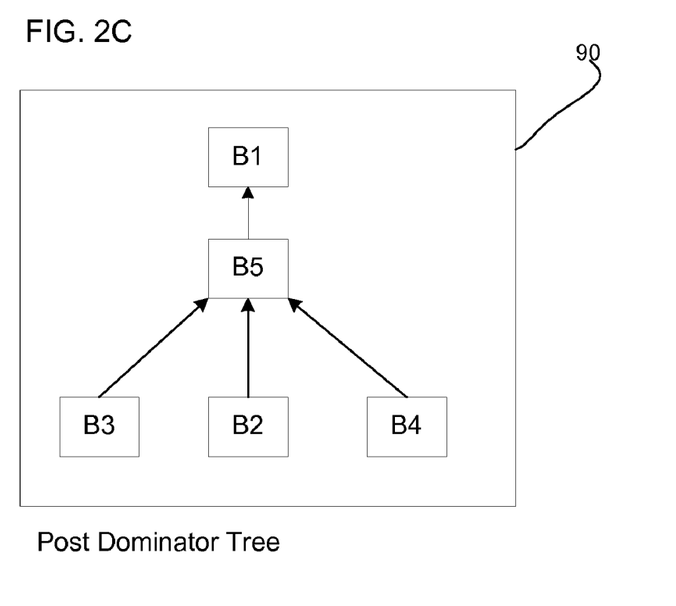
FIG. 2C illustrates an example of a post-dominator tree based on the source code in FIG. 2A.

FIG. 2C illustrates the post-dominator tree 90 for the CFG in FIG. 2B. Post-domination occurs when every control path from one node, e.g. B3, must flow through the post-dominant node, e.g. B5.

Figure 2D:
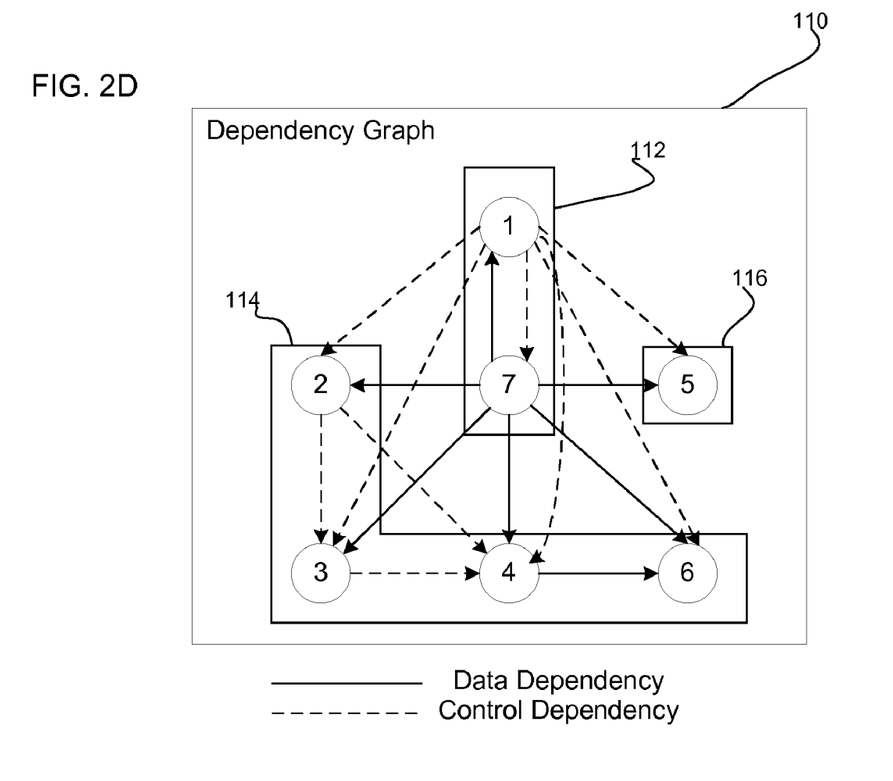
FIG. 2D illustrates an example of a dependency graph based on the source code in FIG. 2A

FIG. 2D illustrates a dependency graph 110, such as dependency graph 16, that the compiler 10 may generate to represent data and control dependencies among the statements. In FIG. 2D, solid lines represent data dependencies and the dashed lines represent control dependencies.

Data dependence exists between two statements if a variable appearing in one statement would have an incorrect value if the two statements are reversed. Further, a statement is control dependent on another if the execution of the former depends on the direction taken at the latter. In certain embodiments, the dependency graph 16 may ignore certain dependencies, such as anti-dependences and output dependencies. A statement is anti-dependent if one of its source operands is the same as a later statement's destination operand. An instruction is output dependent if its destination operand is the same as another instruction's destination operand. Output dependencies may be ignored if the data elements or variables are not live at the loop exit. In such case, the variable can be privatized. If the variable is live at the loop exit, the output dependence cannot be ignored and such dependence will be represented in the dependency graph 16.

Figure 2E:
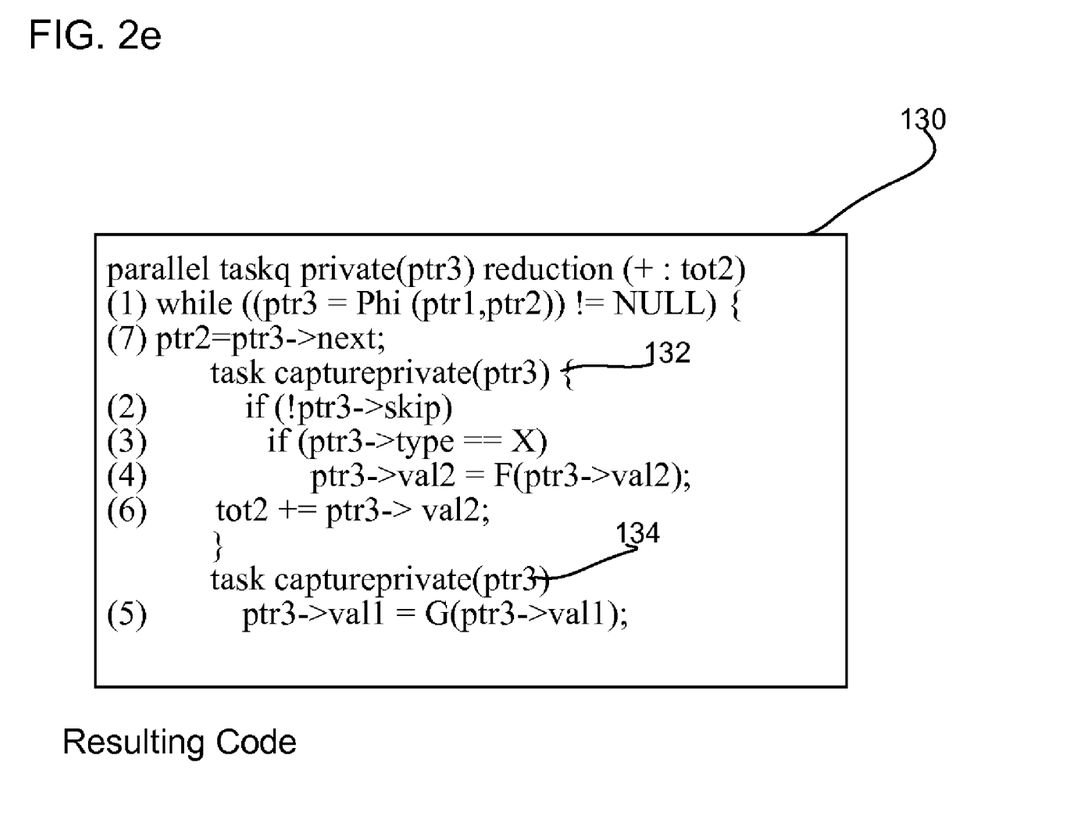
FIG. 2E illustrates an example of parallelized resulting threaded code.

FIG. 2E illustrates the resulting parallelized code 130 after applying this compiler technique to the source code 50.

Figure 3:
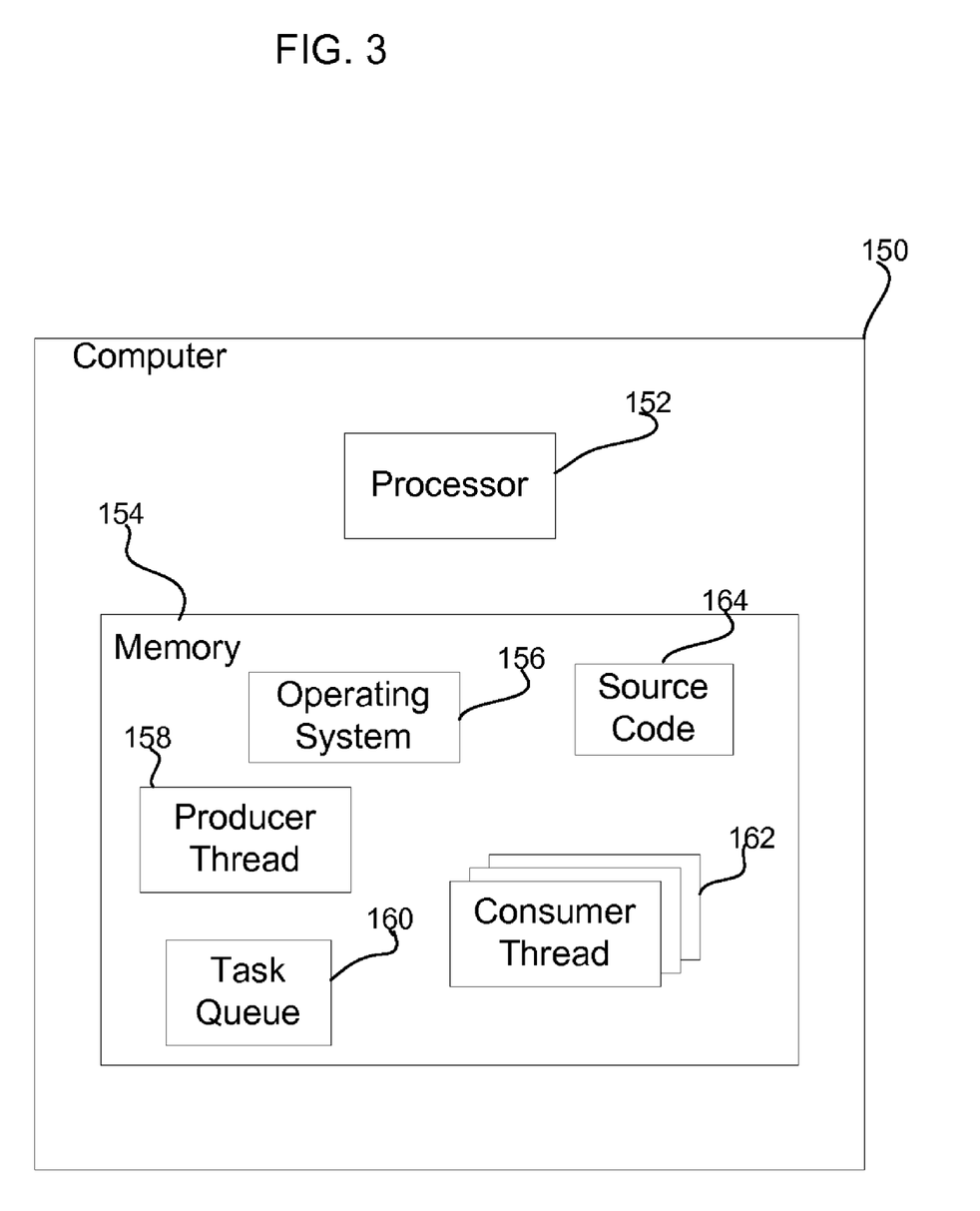
FIG. 3 illustrates an embodiment of a computing environment including source and consumer threads.

FIG. 3 illustrates an embodiment of a computing environment for executing source code. A computer 150 includes a processor 152, a memory 154 (comprising one or more volatile and/or non-volatile memory devices), and an operating system 156 executing in the memory 154. The operating system 156 spawns a producer thread 158, a task queue 160, and one or more consumer threads 162. Source code 164 may be parallelized by adding statements to cause the producer thread 158 to enqueue tasks or work in the task queue 160. Multiple consumer threads 162 may dequeue tasks from the task queue 160 to execute concurrently and in parallel. Tasks to be processed sequentially are processed by the producer thread 156. The consumer threads 162 can execute in parallel by utilizing available hardware contexts such as cores on a multi-core processor, or processors on a multiprocessor system.

Figure 4:
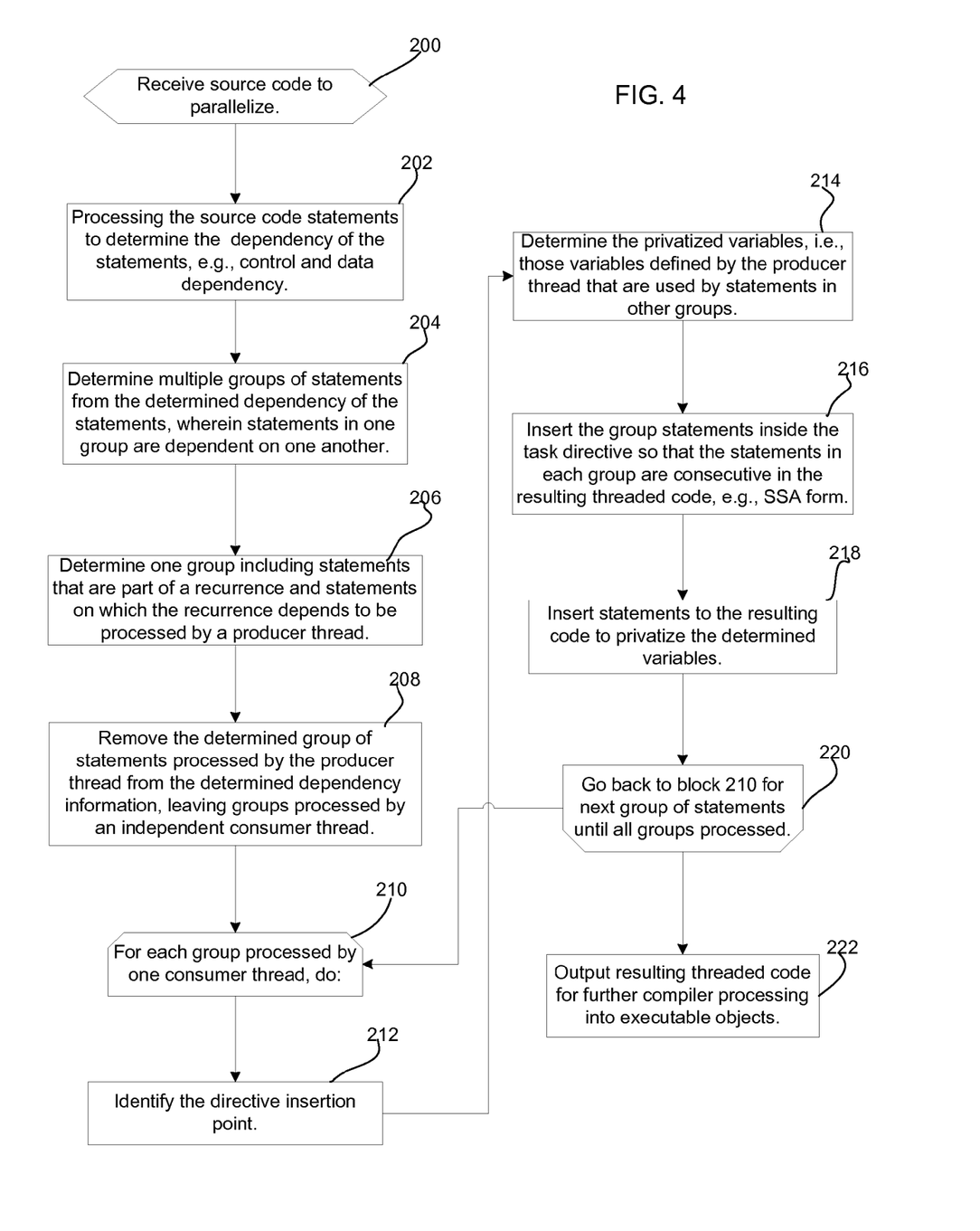
FIG. 4 illustrates an embodiment of operations to parallelize source code.

FIG. 4 illustrates an embodiment of operations performed by the compiler 10 to parallelize source code 8, 70 to produce parallelized resulting threaded code 18, 130. In response to receiving (at block 200) the source code 8, 50, the compiler 10 processes (at block 202) the source code statements to determine the dependency of the statements, e.g., control and data dependency. In one embodiment, determining the dependency may comprise generating a control flow graph 12, 70, post dominator tree 14, 90 and dependency graph 16, 110 showing both control and data dependencies. The compiler 10 further determines (at block 204) multiple groups of statements from the determined dependency of the statements, wherein statements in one group are dependent on one another.

The compiler 10 determines (at block 206) one group including statements that are part of a recurrence and statements on which the recurrence depends to be processed by the producer thread 158 (FIG. 3). In one embodiment, the statements on which a recurrence depends are part of one group that is assigned to be processed sequentially by a main producer thread 158. For instance, in FIG. 2D, a group 112 assigned to the producer part includes statements (1) and (7) which are the statements defining the main loop, which is the group determined at block 206. In one embodiment, the group 112 of statements assigned to the producer 158 may be identified by performing a backwards depth-first search on the dependency graph 16, 110, starting from the statements in each recurrence (cycle). This will identify all the statements that are part of a recurrence, as well as statements on which the recurrences depend. In the example of FIG. 2D, this graph search reaches only the statements involved in the loop test recurrence (statements 1 and 7). Thus, the group 112 including these identified statements is assigned to the group processed by the producer thread 158.

The compiler 10 may remove (at block 208) the determined group of statements 112 processed by the producer thread 158 from the determined dependency graph 16, 110, resulting in a modified dependency graph (not shown) including groups processed by one or more separate consumer threads 162. This modified dependency graph would not have any of the statements determined to be part of the group 112 associated with the producer thread 158. Statements having either control or data dependency with respect to each other in the modified dependency graph are assigned to one group. In the example of FIG. 2D, the statements (2), (3), (4), and (6) are assigned to one group 114 because they have either data and/or control dependency with respect to each another and the statement (5) is assigned to another group 116 because statement (5) has no dependency with respect to the statements in group 114 in the modified dependency graph.

For each determined consumer group, a loop of operations is performed at blocks 210 through 220. The compiler 10 identifies (at block 212) the directive insertion point for a task pragma to cause the statements associated with the task pragma to be added to a task queue 160 to be processed concurrently by one or more consumer threads 162. The task directive insertion point is shown in FIG. 2E as the location of task directives 132 and 134. The compiler 10 further determines (at block 214) the privatized variables, i.e., those variables defined by the statements executed by the producer thread 158 (e.g., in group 114) that are used by statements in other groups, e.g., group 116. The compiler 10 may determine the variables to privatize from the dependency graph 16, 110 by the arcs or control/data dependency lines that cross the producer group 112 to other groups 114, 116. For instance, the dependency graph 110 in FIG. 2D shows arcs from the statements in group 112 to statements in the other groups 114, 116. The common variable being passed between these groups is the "ptr" variable defined in the source code 50, 164 whose data dependency is illustrated in FIG. 2D by the dashed lines. Thus, it is this variable that is privatized in the resulting threaded code 130. In one embodiment, control dependences may be privatized by assigning the corresponding condition to a variable and privatizing this variable. Control dependences from blocks that dominate the inserted task directives, shown as 132 and 134 in FIG. 2E, do not need to be privatized, as the choice of the insertion point will already enforce them. In the example of FIG. 2D, this is the reason why the control dependence from statement 1 to the other statements in FIG. 2D is not privatized.

The compiler 10 inserts (at block 216) the group of statements inside the task directive so that the statements in each group are consecutive in the resulting threaded code, e.g., statements from group 114 are inserted in task directive 132 and the statement in group 116 is inserted in task directive 134. In one embodiment, the statements inserted in the task directive are consecutive and in a static single assignment (SSA) form. In SSA form, every variable is assigned exactly once, such that existing variables in the original source code are split into versions, new variables typically indicated by the original name with a subscript, so that every definition gets its own version. The compiler 10 further inserts (at block 218) statements to the resulting code to privatize the determined variables. For instance, the variable "ptr" in the source code 50 is being privatized because it crosses the group or thread boundaries, and is inserted into the task directives 132, 134 in SSA form that has separate versions of ptr1, ptr2, and ptr3. In FIG. 2E, the "ptr" variable is privatized in the initial task directive 136, as well as task directives 132 and 134 that are processed by different threads.

After processing all the groups to be processed by one of the consumers threads 162, the resulting threaded code 18, 130 may be outputted to the compiler 10 for further processing and transformation into executable code, where the different groups 112, 114, and 116 of statements may be executed concurrently with respect to one another.

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method performing operations with respect to a computer readable storage medium, comprising:
   receiving source code including source code statements;
   processing the source code statements in the computer readable storage medium to determine a dependency of the statements;
   determining multiple groups of statements from the determined dependency of the statements, wherein statements in one group are dependent on one another, wherein any statements forming an inner loop are included in the group including statements comprising an outer loop when a variable from the inner loop is passed to the outer loop;
   inserting at least one directive in the source code, wherein each directive is associated with one group of statements;
   for each group of statements, identifying the directive in the source code and inserting the statements in the group associated with the identified directive inside the identified directive in the source code;
   generating resulting threaded code in the computer readable storage medium including the inserted at least one directive, wherein the group of statements to which the directive in the resulting threaded code applies are processed as a separate task, wherein each group of statements designated by the directive to be processed as a separate task may be processed concurrently with respect to other groups of statements, wherein the resulting threaded code is processed to generate executable objects;
   determining a variable used by statements in different groups; and
   adding statements to the resulting threaded code to privatize the determined variable, wherein the privatized variable is defined by a producer thread and used by one or more consumer threads.

2. The method of claim 1, wherein the statements in one group are consecutive in the resulting threaded code.

3. The method of claim 1, wherein one producer group of statements is processed sequentially by the producer thread, wherein the producer thread processes the inserted directives and in response adds the group of statements associated with the processed directive to a task queue, wherein the one or more consumer threads process the at least one additional consumer group of statements added to the task queue.

4. The method of claim 3, wherein determining the dependency of the statements comprises:
   determining data and control dependency of the statements, wherein statements in the producer group do not depend on statements in any consumer group, and statements in one determined consumer group do not have data or control dependences with respect to other consumer groups.

5. The method of claim 4, wherein the group of statements that are processed by the producer thread comprises one group including statements that are part of a recurrence and statements on which the recurrence depends.

6. The method of claim 4, wherein the resulting threaded code is in a static single assignment form.

7. The method of claim 6, wherein variables defined by the producer thread and used by one or more consumer threads are privatized and defined in static single assignment form as different variables.

8. The method of claim 4, wherein a variable in a conditional statement processed by the consumer thread that is set by the producer thread is defined as a privatized variable in the resulting threaded code.

9. A system, comprising:
a processor; and
a compiler executed by the processor to perform operations comprising:
receiving source code including source code statements;
processing the source code statements to determine a dependency of the statements;
determining multiple groups of statements from the determined dependency of the statements, wherein statements in one group are dependent on one another, wherein any statements forming an inner loop are included in the group including statements comprising an outer loop when a variable from the inner loop is passed to the outer loop;
inserting at least one directive in the source code, wherein each directive is associated with one group of statements;
for each group of statements, identifying the directive in the source code and inserting the statements in the group associated with the identified directive inside the identified directive in the source code;
generating resulting threaded code including the inserted at least one directive, wherein the group of statements to which the directive in the resulting threaded code applies are processed as a separate task, wherein each group of statements designated by the directive to be processed as a separate task may be processed concurrently with respect to other groups of statements, wherein the resulting threaded code is processed to generate executable objects;
determining a variable used by statements in different groups; and
adding statements to the resulting threaded code to privatize the determined variable, wherein the privatized variable is defined by a producer thread and used by one or more consumer threads.

10. The system of claim 9, wherein the statements in one group are consecutive in the resulting threaded code.

11. The system of claim 9, wherein one producer group of statements is processed sequentially by the producer thread, wherein the producer thread processes the inserted directives and in response adds the group of statements associated with the processed directive to a task queue, wherein the one or more consumer threads process the at least one additional consumer group of statements added to the task queue.

12. The system of claim 11, wherein determining the dependency of the statements comprises:
determining data and control dependency of the statements, wherein statements in the producer group do not depend on statements in any consumer group, and statements in one determined consumer group do not have data or control dependences with respect to other consumer groups.

13. The system of claim 12, wherein the group of statements that are processed by the producer thread comprises one group including statements that are part of a recurrence and statements on which the recurrence depends.

14. The system of claim 12, wherein the resulting threaded code is in a static single assignment form.

15. The system of claim 14, wherein variables defined by the producer thread and used by one or more consumer threads are privatized and defined in static single assignment form as different variables.

16. The system of claim 12, wherein a variable in a conditional statement processed by the consumer thread that is set by the producer thread is defined as a privatized variable in the resulting threaded code.

17. An article of manufacture comprising a computer readable storage medium including code executed to perform operations, the operations comprising:
receiving source code including source code statements;
processing the source code statements to determine a dependency of the statements;
determining multiple groups of statements from the determined dependency of the statements, wherein statements in one group are dependent on one another, wherein any statements forming an inner loop are included in the group including statements comprising an outer loop when a variable from the inner loop is passed to the outer loop;
inserting at least one directive in the source code, wherein each directive is associated with one group of statements;
for each group of statements, identifying the directive in the source code and inserting the statements in the group associated with the identified directive inside the identified directive in the source code;
generating resulting threaded code including the inserted at least one directive, wherein the group of statements to which the directive in the resulting threaded code applies are processed as a separate task, wherein each group of statements designated by the directive to be processed as a separate task may be processed concurrently with respect to other groups of statements, wherein the resulting threaded code is processed to generate executable objects
determining a variable used by statements in different groups; and
adding statements to the resulting threaded code to privatize the determined variable, wherein the privatized variable is defined by a producer thread and used by one or more consumer threads.

18. The article of manufacture of claim 17, wherein the statements in one group are consecutive in the resulting thread code.

19. The article of manufacture of claim 17, wherein one producer group of statements is processed sequentially by the producer thread, wherein the producer thread processes the inserted directives and in response adds the group of statements associated with the processed directive to a task queue, wherein the one or more consumer threads process the at least one additional consumer group of statements added to the task queue.

20. The article of manufacture of claim 19, wherein determining the dependency of the statements comprises:
determining data and control dependency of the statements, wherein statements in the producer group do not depend on statements in any consumer group, and statements in one determined consumer group do not have data or control dependences with respect to other consumer groups.

21. The article of manufacture of claim 20, wherein the group of statements that are processed by the producer thread comprises one group including statements that are part of a recurrence and statements on which the recurrence depends.

22. The article of manufacture of claim 20, wherein the resulting threaded code is in a static single assignment form.

23. The article of manufacture of claim 22, wherein variables defined by the producer thread and used by one or more consumer threads are privatized and defined in static single assignment form as different variables.

24. The article of manufacture of claim 20, wherein a variable in a conditional statement processed by the consumer thread that is set by the producer thread is defined as a privatized variable in the resulting threaded code.

* * * * *

UNITED STATES PATENT AND TRADEMARK OFFICE
CERTIFICATE OF CORRECTION

| | | |
|---|---|---|
| PATENT NO. | : 7,882,498 B2 | |
| APPLICATION NO. | : 11/278329 | |
| DATED | : February 1, 2011 | |
| INVENTOR(S) | : G. D. Ottoni et al. | |

It is certified that error appears in the above-identified patent and that said Letters Patent is hereby corrected as shown below:

In the Claims:

Column 8, Lines 43-44, "generate executable objects" should read --generate executable objects;--

Signed and Sealed this
Twenty-third Day of June, 2015

Michelle K. Lee
*Director of the United States Patent and Trademark Office*